(12) United States Patent
Jensen et al.

(10) Patent No.: US 10,602,313 B2
(45) Date of Patent: Mar. 24, 2020

(54) STATE-BASED LOCATION MONITORING

(71) Applicant: Apple Inc., Cupertino, CA (US)

(72) Inventors: Bradley J. Jensen, San Francisco, CA (US); Michael P. Dal Santo, San Francisco, CA (US); Stephen J. Rhee, San Jose, CA (US); Danil Y. Zvyagintsev, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/842,494

(22) Filed: Dec. 14, 2017

(65) Prior Publication Data

US 2018/0352381 A1 Dec. 6, 2018

Related U.S. Application Data

(60) Provisional application No. 62/514,671, filed on Jun. 2, 2017.

(51) Int. Cl.
*H04W 4/02* (2018.01)
*G01S 19/34* (2010.01)
(Continued)

(52) U.S. Cl.
CPC .............. *H04W 4/025* (2013.01); *G01S 19/34* (2013.01); *G06F 1/3231* (2013.01);
(Continued)

(58) Field of Classification Search
CPC ................................ H04W 4/025; H04W 4/021
See application file for complete search history.

(56) References Cited

U.S. PATENT DOCUMENTS 9,078,766 B2 7/2015 Dadu et al.
9,432,944 B1 8/2016 Benegal et al.
(Continued)

FOREIGN PATENT DOCUMENTS

CN 103959754 7/2014
CN 104620642 5/2015
(Continued)

OTHER PUBLICATIONS

Wang et al., "A framework of energy efficient mobile sensing for automatic user state recognition", Proceeding of the 7$^{th}$ International Conference on Mobile Systems, Application , and Services, Mobisys 109, Jun. 2009, pp. 179-192.
(Continued)

*Primary Examiner* — Kwasi Karikari
(74) *Attorney, Agent, or Firm* — Kilpatrick Townsend & Stockton LLP

(57) ABSTRACT

Techniques are disclosed for state-based location monitoring and determining a location of a mobile device. An application processor identifies a desired movement state. The application processor notifies a coprocessor of the desired state and enters a low power mode. The coprocessor monitors movement data to determine whether the desired state has occurred. In the event the desired state has occurred, the coprocessor will notify the application processor. The application processor can then determine whether it should switch to a high power mode.

23 Claims, 8 Drawing Sheets

(51) Int. Cl.
    *H04W 52/02*     (2009.01)
    *G06F 1/3231*     (2019.01)
    *G06F 1/3293*     (2019.01)
    *H04W 4/021*     (2018.01)

(52) U.S. Cl.
    CPC .......... *G06F 1/3293* (2013.01); *H04W 4/021* (2013.01); *H04W 52/0254* (2013.01)

(56) References Cited

U.S. PATENT DOCUMENTS

| | | | |
|---|---|---|---|
| 2004/0094613 A1* | 5/2004 | Shiratori | A61B 5/1118 235/105 |
| 2011/0093729 A1* | 4/2011 | Mucignat | G06F 1/3203 713/323 |
| 2013/0102268 A1 | 4/2013 | Wang et al. | |
| 2014/0013141 A1 | 1/2014 | Heo et al. | |
| 2015/0099546 A1* | 4/2015 | Heo | H04W 4/02 455/456.3 |
| 2015/0212108 A1 | 7/2015 | Kahn et al. | |
| 2015/0230183 A1 | 8/2015 | Stogaitis et al. | |
| 2016/0279501 A1 | 9/2016 | Jang et al. | |
| 2016/0358451 A1 | 12/2016 | Adler et al. | |
| 2016/0360368 A1 | 12/2016 | Marti et al. | |
| 2017/0041874 A1 | 2/2017 | Jarosinski et al. | |

FOREIGN PATENT DOCUMENTS

| | | |
|---|---|---|
| CN | 104756557 | 7/2015 |
| CN | 105103079 | 11/2015 |
| CN | 105284163 | 1/2016 |
| WO | 2007099471 | 9/2007 |

OTHER PUBLICATIONS

Yan et al., "Energy-Efficient Continuous Activity Recognition on Mobile Phones: An Activity-Adaptive Approach", Wearable Computers (ISWC), 2012 16th International Symposium on. Ieee, 2012., 2012, 8 pages.

International Patent Application No. PCT/US2018/034427, "International Search Report and Written Opinion", dated Sep. 4, 2018, 13 pages.

Chinese Patent Application No. 201820825525.2, "Utility Model Patentability Evaluation Report Received (UMPER)", Sep. 27, 2019, 15 pages.

\* cited by examiner

STATE-BASED LOCATION MONITORING

CROSS REFERENCE TO RELATED APPLICATION

This application claims priority to U.S. Provisional Patent Application No. 62/514,671, filed on Jun. 2, 2017, the disclosure of which is hereby incorporated by reference in its entirety.

BACKGROUND

A central processing unit (CPU) of a mobile device may go to "sleep" when not being used. When a location of the mobile device is needed, the CPU can be "woken up" in order to obtain the location information.

Location information of a mobile device may be needed by an application executing on the mobile device. The location information is provided to the application via the CPU of the mobile device. The CPU can periodically obtain location information of the mobile device. For example, the CPU can obtain location information every fifteen (15) minutes. The location information can be obtained using location circuitry, such as a global positioning system (GPS).

However, it is a drain on the resources of the CPU and the mobile device to periodically obtain location information. Specifically, periodically waking up the CPU to obtain location information is a drain on the resources of the application processor and can be costly. Further, when the CPU is woken up to obtain location information, other components of the mobile device may also use the resources of the CPU. For example, daemons in the mobile device may be waiting for the CPU to wake up so that operations corresponding to the daemons can be performed.

Therefore, periodically waking up the application processor is inefficient, costly, and can require a lot of resources (e.g., battery life) of the mobile device.

SUMMARY

The example embodiments provide techniques (including methods, systems, devices, code or computer program stored on a computer-readable non-transitory memory and comprising instructions executable by one or more processors) for obtaining a location of a mobile device.

An application processor (AP) is a main processor of a mobile device, such as a mobile phone or a smart watch, and can identify a current location (e.g., GPS coordinates) of the mobile device.

In accordance with some example embodiments, the application processor can be woken up based on a change in state of the device as determined by a coprocessor of the mobile device, which may continue to be on. Since the coprocessor determines when the application processor should be woken up in order to obtain location information, the number of times the application processor is woken up can be reduced. As examples, the coprocessor can be a motion coprocessor (such as gyroscope and accelerometer) or a network chip (e.g., WiFi Chip). The coprocessor can consume fewer resources and be less expensive to run than the application processor, thereby saving power.

In accordance with some example embodiments, the application processor can inform the motion coprocessor that it is going to "sleep" and request to be woken up in the event of a state change, e.g., a particular state change detected by the coprocessor. For example, the application processor can request to be woken up if the mobile device has transitioned to a state in which location information of the mobile device might be desired, e.g., a transition from a motion state to a stationary state.

As examples, the states identified by the application processor can include a settled state, an unsettled state, and an unknown state. Example changes in the state of the device or transitions can include unknown to settled, unknown to unsettled, settled to unsettled, or unsettled to settled. A settled state can be a state in which device sensors indicate that the device is stationary (e.g., motionless) or a state in which a WiFi access point is consistently available. An unsettled state can be a state in which motion sensors of the device indicate that the device is in a moving state (e.g., driving, walking, running, etc.), or a state in which the WiFi footprint is not consistently available. An unknown state can be a state in which the state of the device is not currently known. A device can initially be in an unknown state until another state is determined.

After the coprocessor detects a motion classification corresponding to the desired state change, the coprocessor can wake up the application processor, and the application processor can request location information (e.g., GPS location information) for the mobile device.

Certain embodiments are directed to systems, portable consumer devices, and computer readable media associated with the methods described herein.

A better understanding of the nature and advantages of the example embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which.

DETAILED DESCRIPTION

The present disclosure relates generally to determining a location of a mobile device (e.g., phone, smart watch) based on the state of the mobile device and reducing an amount of resources consumed by an application processor of the mobile device in identifying mobile device location.

Different types of applications can be installed on a mobile device or can communicate with a mobile device. A mobile device can include, for example, a mobile phone, a smart watch, or any portable electronic device. Some applications may request location information (e.g. current location coordinates) of the mobile device. Specifically, applications may register for location information, e.g., via system services. Multiple applications may be running on the mobile device and therefore, the mobile device may be required to obtain location information for multiple applications operating on the mobile device.

In accordance with an example embodiment, the application processor is not woken up often (e.g., every few minutes) to obtain location information. Instead, the application processor can be woken up or a determination as to whether the application processor should be woke up can be trigged, when a coprocessor determines that a desired state has occurred. The application processor can be placed in a sleep state (or other low power mode) and be woken up when the desired state occurs. The desired state may be specified by the application processor, and communicated to the coprocessor. Prior to waking up the application processor, it can be determined whether the desired state has occurred for at least a specified amount of time, thereby increasing the accuracy of the state determination and reducing unnecessarily waking up the application processor.

These are merely examples, and the example embodiments can be applied to other situations where preserving the resources of the application processor and decreasing costs in determining location and location changes is desired.

I. Overview of Mobile Device Location Determination

In accordance with an example embodiment, the application processor obtains the location of the mobile device in response to the occurrence of a desired state, as can be determined by a coprocessor of the mobile device.

Figure 1:
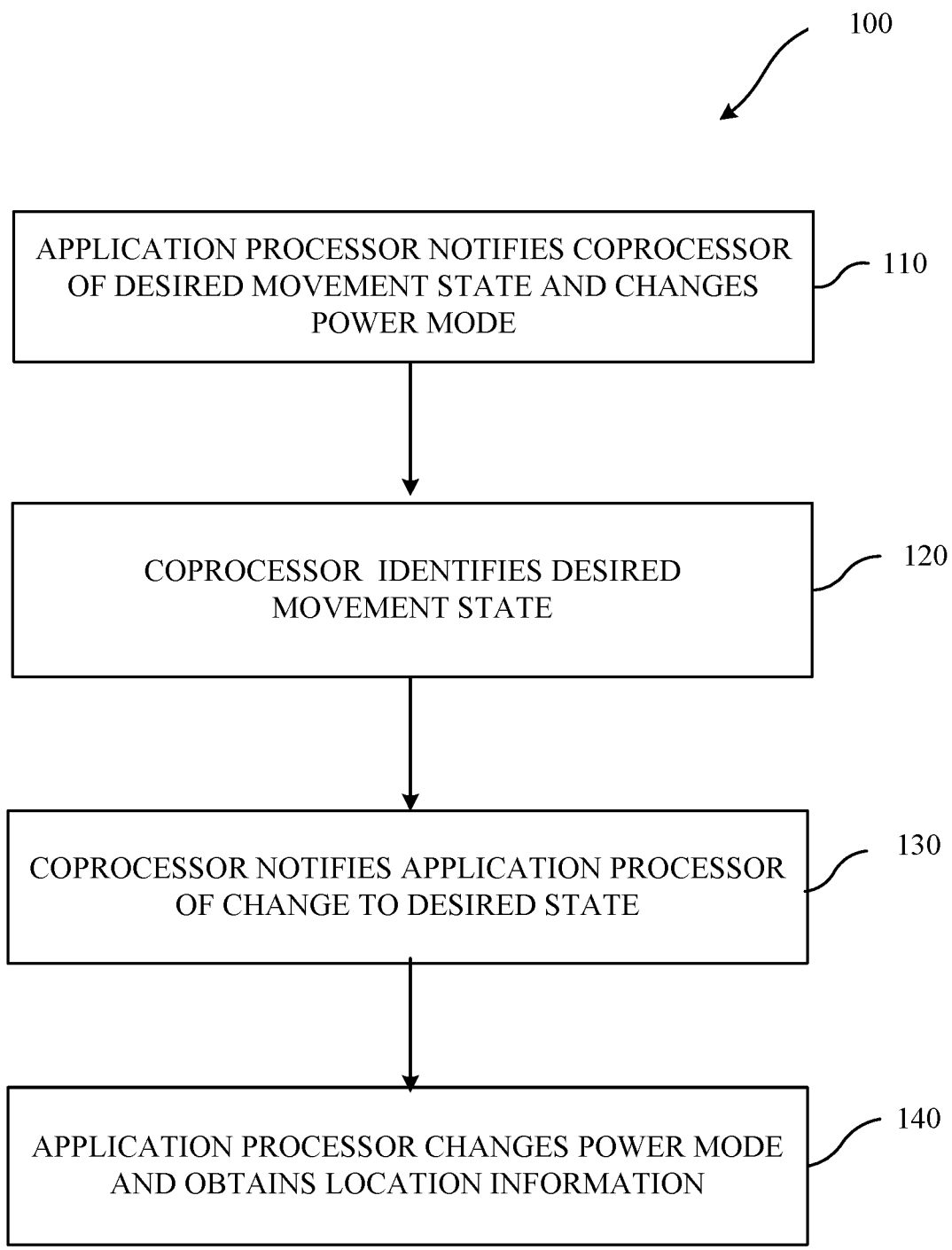
FIG. 1 illustrates a flowchart of a method of determining a location of a mobile device, in accordance with some example embodiments.

FIG. 1 illustrates a method 100 of determining a location of a mobile device, in accordance with some example embodiments. Method 100 can provide energy savings by enabling an application processor of the mobile device to control when it is woken up from a sleep mode. For example, the application processor can specify what movement state the mobile device should be, in order for the application processor to be woken up.

As shown in FIG. 1, at step 110, the application processor is an awake mode or not in a low power state. When the application processor is in an awake mode, the application processor can be in a high power mode. In the examples described, the application processor switches between a low power and high power mode. However, the application processor can switch between a low power mode and a mode other than a low power mode. The application processor obtains location information of the mobile device. The application processor notifies one or more coprocessors that is it going to sleep and to wake up the application processor when a desired state occurs. The desired state can correspond to, for example, a settled state or an unsettled state, which is further described below. After registering the desired movement state with the one or more coprocessors, the application processor changes from a high power mode to a low power mode, e.g., it goes to sleep. The high power mode can be high only in the sense that it uses more power than the low power mode.

At step 120, while the application processor is in a low power mode, the one or more coprocessors can monitor movement information of the mobile device in order to determine whether the desired state has occurred. For example, the coprocessors can determine whether the movement information corresponds to a stationary, moving, pedestrian or vehicle movement classification.

At step 130, in response to the one or more coprocessors determining that the desired state has occurred, the one or more coprocessors notify the application processor regarding the occurrence of the desired state. The one or more coprocessors can determine that the desired state has occurred by monitoring movement information of the mobile device and classifying the movement information. The one or more coprocessors can determine whether the motion classification of the movement information corresponds to the desired state. The movement information can be measured by sensors such as an accelerometer or a gyroscope.

At step 140, in response to receiving the notification from the one or more coprocessors, the application processor can determine if location information is needed. If the location information is needed, the application processor can wake up and change from the low power mode to a high power mode and can obtain location information of the mobile device. The application processor can obtain location information using location circuity, such as a global positioning system (GPS), WiFi, beacons, etc.

The method described above is a general example embodiment of obtaining location information for a mobile device and the steps will be described in greater detail below.

II. System

The application processor of the mobile device can communicate with one or more coprocessors of the mobile device in order to determine whether location information should be obtained.

Figure 2:
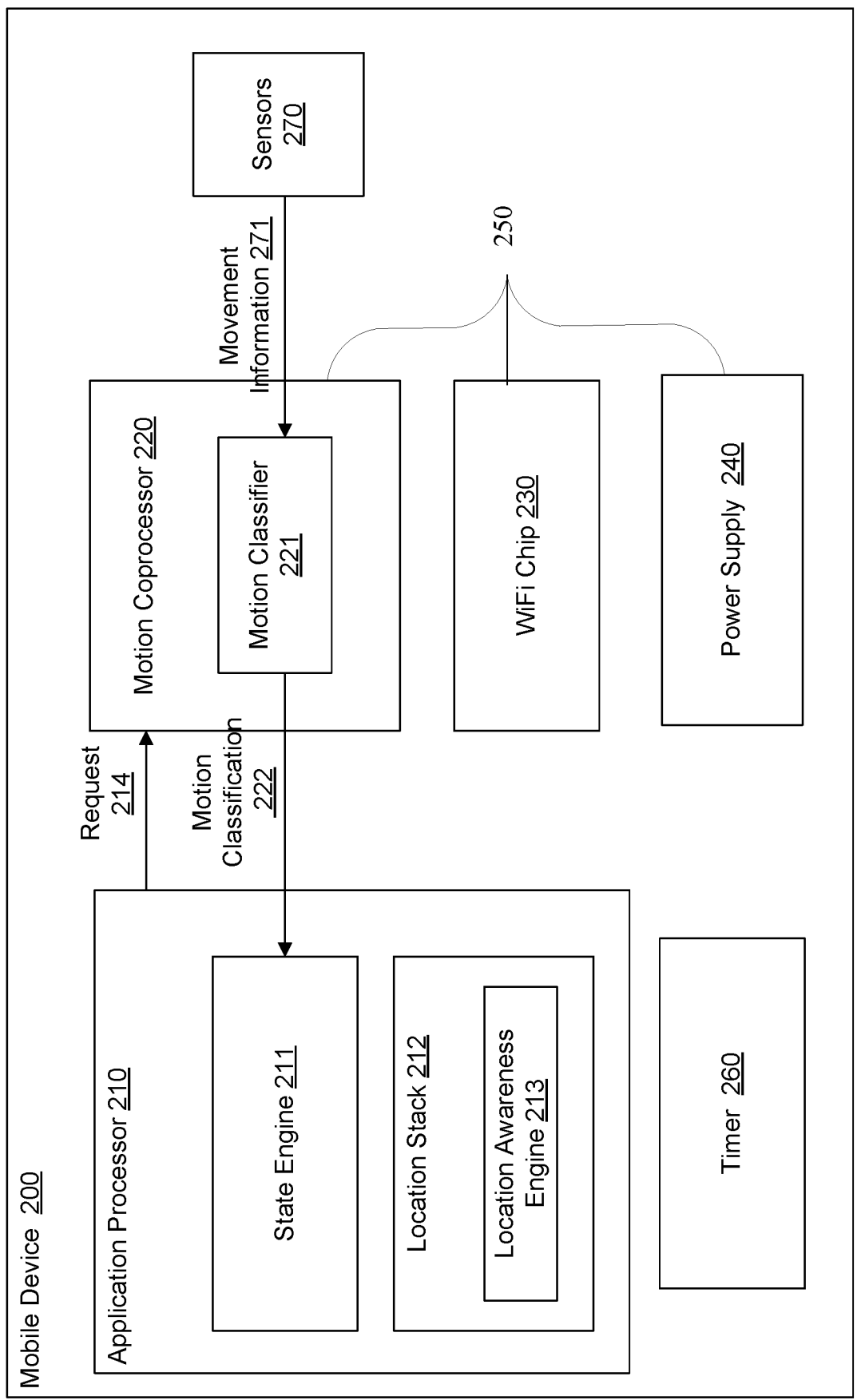
FIG. 2 is a block diagram illustrating an example system of a mobile device, in accordance with some example embodiments.

FIG. 2 illustrates an example system of a mobile device 200, in accordance with some example embodiments. The mobile device 200 can include an application processor 210, one or more coprocessors 250, a timer 260 and sensors 270. The application processor 210 can include a state engine 211 and a location stack 212. The location stack 212 can include a location awareness engine 213. The coprocessors 250 can include motion coprocessor 220, a network chip 230, and a power supply 240. The motion coprocessor 220 can include a motion classifier 221. The motion classifier 221 can also be called a state classifier.

Motion coprocessor 220, network chip 230, and power supply 240 are identified as coprocessors since they are used to determine whether a particular motion state has occurred. Although motion coprocessor 220, network chip 230, and power supply 240 are identified as coprocessors, other sensors can be used to identify and determine movement of the mobile device 200. Further, the coprocessors can be used individually or in combination. For example, only one of the coprocessors 250 (motion coprocessor 220, network chip 230, or power supply 240) can be used to identify a motion state of the mobile device or a plurality of the coprocessors 250 can be used to identify a motion state of the mobile device.

A. Application Processor

An application processor 210 can be a main processor or a central processing unit (CPU) of the mobile device 200. The application processor 210 can operate to control the operations of the components of the mobile device 200. Therefore, continuously operating the application processor 210 can consume a lot of resources.

As shown in FIG. 2, the application processor can include state engine 211 and location stack 212.

1. State Engine

The state engine 211 determines a current movement state of the mobile device based on motion classifications received from the one or more coprocessors 250. If the motion classification is received from the one or more coprocessors 250, a state of the mobile device can correspond to an unknown state, a settled state, or an unsettled state.

a) Unknown State

An unknown state indicates that a current state of the device is unknown. The mobile device can initially be in an unknown state until its state is determined. Further, if state data is unclear, the mobile device may be in an unknown state until further information is acquired. For example, motion data for a greater period of time may be obtained.

b) Settled State

In a settled state, it is determined that the that mobile device 200 is not moving. This can mean that there is no change in geographic location coordinates of the mobile device 200 or that there is no changed within a threshold value. For example, if a user is sitting at a movie theatre, there would be no movement of the mobile device. A settled state can also include some movement of the mobile device, even when there is no change in the geographical coordinates of the mobile device. Therefore, although there is movement, there may no change to geographic coordinates and such movement can be interpreted as noise. A user is unloading groceries at home or running on a treadmill at the gym are examples of movement in which there is no change to geographic coordinates of the mobile device. The determination that the mobile device is in the settled state can be based on a confidence score of the motion classifications. A motion classification that appears more often in a period of time can have a higher confidence score than a motion classification that appears less often in a period of time.

Figure 8:
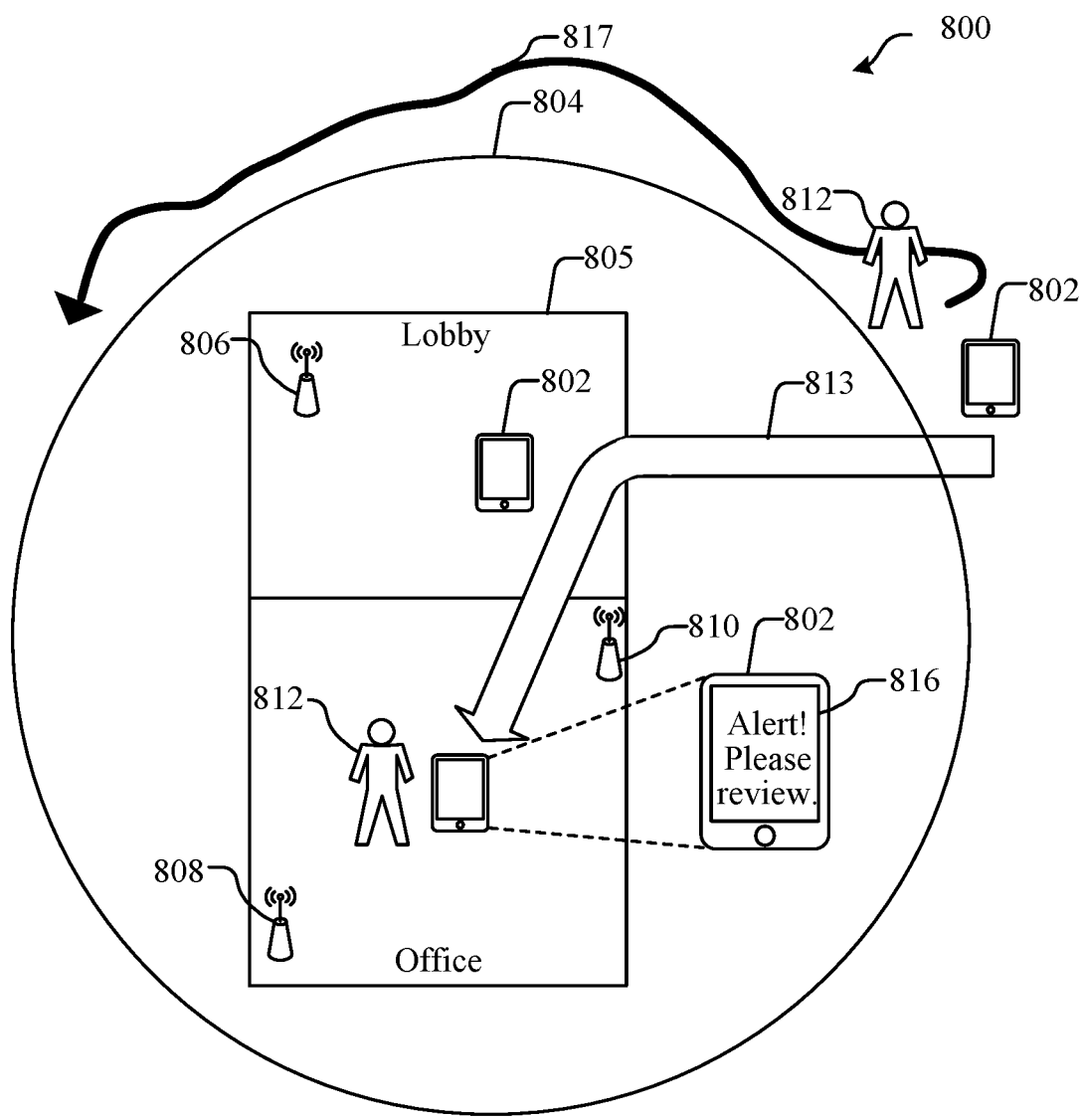
FIG. 8 illustrates an example of detecting a settled state, in accordance with some example embodiments.

FIG. 8 illustrates an example of detecting a settled state, in accordance with some example embodiments.

Mobile device 802 can be a device configured to perform an action upon entering geofenced environment 804. The action can be performing a system function of mobile device 802 or executing an application program of mobile device 802. In the example shown, mobile device 802 is configured to display an alert "Please review" upon entering geofenced environment 804.

Geofenced environment 804 can be a geographic area (e.g., office building 805) enclosed by a "virtual" fence. Mobile device 802 can determine that mobile device 802 has crossed geofenced environment 104 using various sensors and positioning technologies, for example, by using signals from a global navigation satellite system (GNSS), wireless access points (e.g., Wi-Fi™ access points) or both.

In the example shown, mobile device 802 is carried into geofenced environment 804 by user 812. Mobile device 802 can determine that mobile device 802 entered geofenced environment 804 by detecting signals from wireless access points 806, 808 and 810. Instead of immediately displaying a notification (e.g., an alert) upon entering geofenced environment 804, mobile device 802 can determine whether user 812 is in a settled state.

User 812 has settled down when activity of user 812 as determined by measurements of environment variables indicates in a statistical sense that the user 812 is ready to interact with mobile device 802 performing the action. In the example shown, user 812 carries mobile device 802 while walking along path 813, passing a lobby of office building 805 and entering an office of user 812. Walking along path 813 (as indicated by motion sensors and a floorplan) is detected as an unsettled state. User 812 then sits down in a chair in her office. Sitting down in a chair in her office (as indicated by motion sensors and a floorplan) is detected as a settled state. Mobile device 802 can determine that user 812 has settled down after user 812 sits in her chair even if mobile device 802 itself is in motion. For example, mobile device 802 can determine that user 812 has settled down even if user 812, after sitting down in the chair, pulls mobile device 802 from a pocket and shakes mobile device 802 or otherwise moves mobile device 802.

Upon determining that user 812 has settled down, mobile device 802 can perform the action, e.g., by displaying the alert on a screen 816 of mobile device 802. Accordingly, mobile device 802 delays performing the action from the time of geofence crossing to the time user 812 has settled down and is in a settled state.

The user 812 can also move (e.g., movement 817) outside of the geofenced environment 804. There can be a constant footprint if the mobile device 802 is stationary outside of the geofenced environment 804. If the footprint is constant, then the mobile device can be in a settled state.

c) Unsettled State

In an unsettled state, it is determined that the mobile device is moving. Such movement can result in a change in the geographic location coordinates of the mobile device 200. An unsettled state can include any pedestrian states (e.g., walking, running, etc.) or vehicle states (e.g., driving, biking, etc.). Therefore, the application processor may not be concerned with slight movements of the mobile device 200 that would not require any updates to location information. Slight movements of the mobile device 200 would not result in requiring updated location information. Therefore, in the unsettled state, there can be a change in the geographic location coordinates of the mobile device. The determination that the mobile device is in the unsettled state can be based on a confidence score of the motion classifications. A motion classification that appears more often in a period of time can have a higher confidence score than a motion classification that appears less often in a period of time.

2. Location Stack

The location stack 212 can be used to store location information of the mobile device 200. The location stack can include a location awareness engine 213. The location awareness engine 213 can be aware of location states of the mobile device. The location stack 212 can create a log of where the mobile device has been. The log maintains a history of locations of the mobile device. The log can be stored in a memory of the mobile device. If the desired state has been obtained, then the location stack 212 will be woken up to obtain location information.

The application processor 210 can communicate with the one or more coprocessors 250 and can send a request 214 to the motion coprocessor 220 to be notified regarding desired movement classifications, e.g., that the mobile device has changed to a particular movement state.

B. Mobile Device Coprocessors

Mobile device coprocessor obtain movement information and classify the movement information. Mobile device coprocessors can include a motion coprocessor, network chip, and power supply.

1. Motion Coprocessor

Motion coprocessor 220 can include motion classifier 221. Motion coprocessor 220 can obtain movement information of the mobile device 200. For example, motion coprocessor 220 can receive movement information including measurements from one or more motion sensors 270, such as an accelerometer or a gyrometer. After receiving movement information 271 from the one or more motion sensors, motion coprocessor can classify the movement information using the motion classifier 221.

The sensors 270 can include an always-on processor that can be used to determine movement information. For example, the motion coprocessor 220 can communicate with accelerometer or gyrometer that can continuously monitor movement information at a lower cost of energy than the application processor.

The motion classifier 221 or state classifier can be used to classify the movement information. For example, the motion classifier can classify received movement information as corresponding to pedestrian states (e.g., walking, running, etc.) or vehicle states (e.g., driving, biking, etc.). The motion coprocessor 220 can communicate the movement classification to the application processor 210.

The motion classifier 221 of the motion coprocessor 220 can receive movement information from any one or more of sensors 270. The motion classifier 221 can use the movement information to determine a probability for one or more classifications. The classifications can include stationary, moving, pedestrian or vehicle. A pedestrian classification can include a sub-classification of walking, running, or other pedestrian movements. A vehicle sub-classification can include driving in a car, bicycle, or other vehicle. The motion classifier 221 can assign a probability or confidence score for each predetermined classification based on the movement information provided to the motion classifier 221. The motion classifier 221 can send all of the classifications and sub-classification with the associated probabilities and/or confidence score to the state engine 211 of the application processor 210.

In the example shown, motion classifier 221 receives movement information from one or more sensors 270, which might be an accelerometer or a gyroscope. Motion classifier 221 can then determine a motion classification of the mobile device. An accelerometer can measure acceleration. A gyrometer (or gyroscope) could be used to determine angular motion, which might indicate spinning or a type of mechanized motion.

2. Network (e.g. WiFi) Chip

Network chip 230 can be used to identify the wireless area networks being used by the mobile device 200 (e.g., WiFi footprint). For example, if the mobile device 200 switches from a first WiFi network to a second WiFi network, it can be determined that the mobile device is moving since it has switched WiFi networks. If the WiFi environment is static, it is not likely that the mobile device is moving.

The WiFi chip can identify a network when a user selects a new WiFi network or if the WiFi chip detects that a previous WiFi network is no longer available and a new WiFi network that is available in a current location should be selected.

Wireless access points can be used to determine whether the mobile device 200 is settled. The mobile device 200 can include a radio frequency (RF) signal receiver that can detect signals from wireless access points. Mobile device 200 can record readings of the RF receiver. The readings can include measurements of the RF signals. Based on the readings, motion classifications and their corresponding movement state can be identified.

3. Power Supply

Power supply 240 can be used to determine whether movement classification is needed. The amount of power being used by the mobile device 200 can indicate whether the mobile device is moving. For example, if the mobile device 200 is powered down, this may indicate that the mobile device 200 is not being used, and therefore, location information does not need to be obtained. However, if it is determined that the mobile device 200 has powered up, this may indicate that the mobile device 200 has been turned on, and therefore, updated location information should be obtained. The mobile device can be powered-up when, for example, the display is active or the application processor is active. For example, the mobile device may have been turned off during transit in an airplane and is turned back on upon arrival in a different city or country. Therefore, updated location information should be obtained.

Although the motion coprocessor 220, network chip 230, and power supply 240 are described as examples of coprocessors 250, other types of sensors can be used as coprocessors. Specifically, any kind of sensor that can be used to determine the movement of the mobile device 200 can be used as a coprocessor. Further, the coprocessors 250 can be used individually or in combination. That is, two or more of the coprocessors 250 can be used to determine movement of the mobile device 200. For example, motion classifications from two or more of the coprocessors can be used to increase the confidence score of a current motion classification of the mobile device.

The system of the mobile device can use time information, in addition to the motion classifications, in order to determine whether an application processor should be woken up.

C. Timer

Although application processor 210 can be woken up (e.g., moving from a lower power mode to a higher power mode) based on signals from one or more of coprocessors 250, this may not happen for a long time. It may be desired to not have too long of an interval between determinations of a location of the mobile device. The timer 260 can be a fall back timer or a default timer, so as to provide a maximum amount of time between location determinations.

Accordingly, timer 260 can be used to further verify if the application processor should be woken up. The timer can store timer values for each of the movement states. For example, a state timer value stored for a settled state can be 60 minutes, and a state timer value stored for an unsettled state can be five minutes. The state timer value for each of the states can be predetermined or can be adjusted according to the user. When this maximum delay time is triggered, timer 260 can cause application processor 210 to wake up.

The timer 260 can also store a log of times indicating when the application processor was last woken up or when the application processor last went to sleep. Based on, for example, the last time the application processor was woken up or last went to sleep, it can be determined whether the application processor should be woken up. Thus, a minimum delay time can be required between the application processor going to sleep and being woken up. For example, if the mobile devices has transitioned to a motion classification corresponding to an unsettled state, but it has been two minutes since it was last determined that the mobile device has transitioned to an unsettled state, the application processor will not be woken up. The application processor is not woken up since the two minutes is less that the state timer value of five minutes for the unsettled state. Therefore, it is unlikely that the user has entered a new location or that location information should be obtained.

If the one or more coprocessors 250 determines that the application processor should be woken up, a timer value (e.g., as stored in the timer) can be referred to in order to further confirm whether the application processor should be woken up. If location information has not been recently obtained based on the information in the timer 260, the location information may now be obtained. Further, if the timer value had not yet expired, the timer value can be moved forward form the time that the location was last obtained. The timer 260 can be used in combination with the coprocessors 250. However, the coprocessors 250 can determine that the application processor 210 should be woken up without referring to the timer 260.

Therefore, in accordance with example embodiments, movement classifications of the mobile device can be obtained and if the movement classification satisfies a state desired by the application processor, the application processor may be woken up. The application processor may use a combination of movement classification in addition to predetermined time values or default timers in determining whether to wake up the application processor. The total operating time of the application processor is decreased, thereby decreasing the amount of resources used. Further, the application processor, which can be costly to operate, is used less frequently and more efficiently.

III. Method of Determining Mobile Device Location

Figure 3:
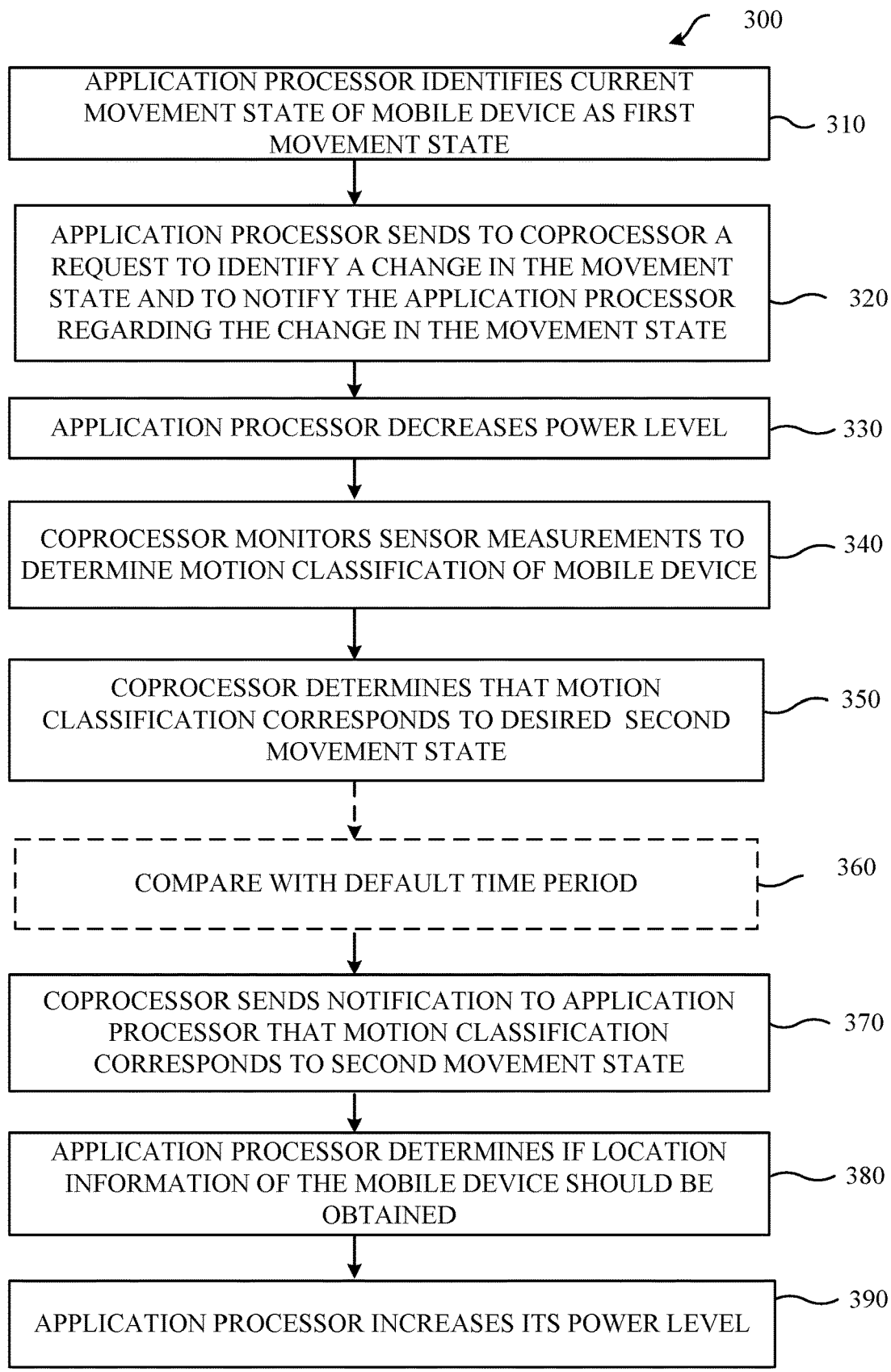
FIG. 3 illustrates a flowchart of a method for determining a location of a mobile device, in accordance with some example embodiments.

FIG. 3 illustrates a method 300 for determining a location of a mobile device, in accordance with some example embodiments. Method 300 can correspond to method 100 in FIG. 1. However, method 300 describes the method of FIG. 1 provides more detail. Further, the mobile device described in FIG. 3 can correspond to mobile device 200 described in FIG. 2. For example, application processor 210, state engine 211, location stack 212, motion coprocessor 220, motion classifier 221, network chip 230 and power supply 240 can be used to implement the method of FIGS. 1, 3, 4 and 5.

Although the steps in the methods below are described in a particular order, the order of the steps can be changed or one or more of the steps can be removed.

At step 310, the application processor identifies the current movement state of the mobile device based on motion classifications received from one or more coprocessors. For example, the application processor can identify a first movement state (e.g., unknown, settled, unsettled) of the mobile device as the current movement state. The application processor can identify the movement state based on a stream of motion classifications received from the coprocessor. The coprocessors can include a motion coprocessor, network chip and/or power supply. For example, the application processor can receive movement classifications from the motion coprocessor, and the application processor can identify that is in an unknown state. For example, the motion classification may be inconclusive and there is no clear indicated of a corresponding state.

At step 320, the application processor sends to the one or more coprocessors a request to identify a change in the first movement state of the mobile device to a second movement state. Further, the application processor can request to be notified regarding a particular change (transition) in the movement state of the mobile device. For example, the application processor can send the request to a motion coprocessor and request to be notified when the state transitions from the unknown state to an unsettled state.

At step 330, after the application processor sends the request to a coprocessor, the application processor will decrease its power level. For example, the application processor can go to sleep or will enter a low power mode.

At step 340, the coprocessor monitors movement information received from one or more sensors in order to determine a motion classification of the mobile device. The sensors can include an accelerometer or gyrometer that can provide movement information to the coprocessor. The coprocessor can receive movement information over a period of time and classify the movement information into a motion classification in order to determine a current motion classification of the mobile device. For example, the WiFi chip can monitor network ID's to determine movement information of the mobile device.

At step 350, the coprocessor can determine that the current motion classification determined in step 340 corresponds with the second movement state. That is, the current movement state is different from its previous movement state. Further, the second movement state is the state that is desired by the application processor, and therefore, the application processor should be informed that the mobile device has entered the state desired by the application processor.

At step 360, prior to sending the notification to the application processor, it can additionally be determined whether the desired change in the movement state as requested by the application processor occurs within a default time period. The default period of time can also be called a latency period. If the desired change in state as specified in the request of the application processor does not occur within the default time period, then a notification can be sent to the application processor. The default time period is an amount of time during which a location should be determined. The default time period can be based on the last time a location was determined. For example, the default time period can correspond to 60 minutes so that the location is obtained at least every 60 minutes.

Therefore, if the location was within the default time period, it may be determined that there is no need to wake up the application processor and the coprocessor will not wake up the application processor. Further, the default time period that has not expired can be updated. For example, the default time period can be restarted (e.g., restart 60 minute latency period) after the determination was made that there is no need to wake up the application processor.

The method 300 can stop at step 360 if it is determined that a notification should not be sent to the application processor. However, if the default time period has been met (e.g., default time period has been met or passed), then it can be determined that the application processor should be notified that its desired movement state has occurred. Alternatively, step 360 can be skipped and the application processor can be notified that that movement state desired by the application processor has occurred based on the movement classification received from the motion coprocessor without using the default time period.

At step 370, the coprocessor sends the application processor a notification regarding a motion classification of the mobile device corresponding to the desired second movement state. The notification can include the motion classification as determined by the coprocessor. The notification can also include a confidence score for the motion classification and other information in order for the application processor to determine if it should wake up.

At step 380, the application processor receives the notification from the coprocessor and can determine whether location information is needed. If location information should be obtained, then the application processor obtains location information of the mobile device. The application processor obtains geographical location coordinates of the mobile device. The application processor can use a GPS or other location circuitry in order to determine a current location of the mobile device.

At step 390, if location information should be obtained, then the application processor switches from the low power mode or sleep mode to a high power mode or awake mode, and obtains location information of the mobile device. The location information can be geographical location coordinates of the mobile device. The application processor can use a GPS or other location circuitry in order to determine a current location of the mobile device.

IV. Method of Registering for Transition State

Figure 4:
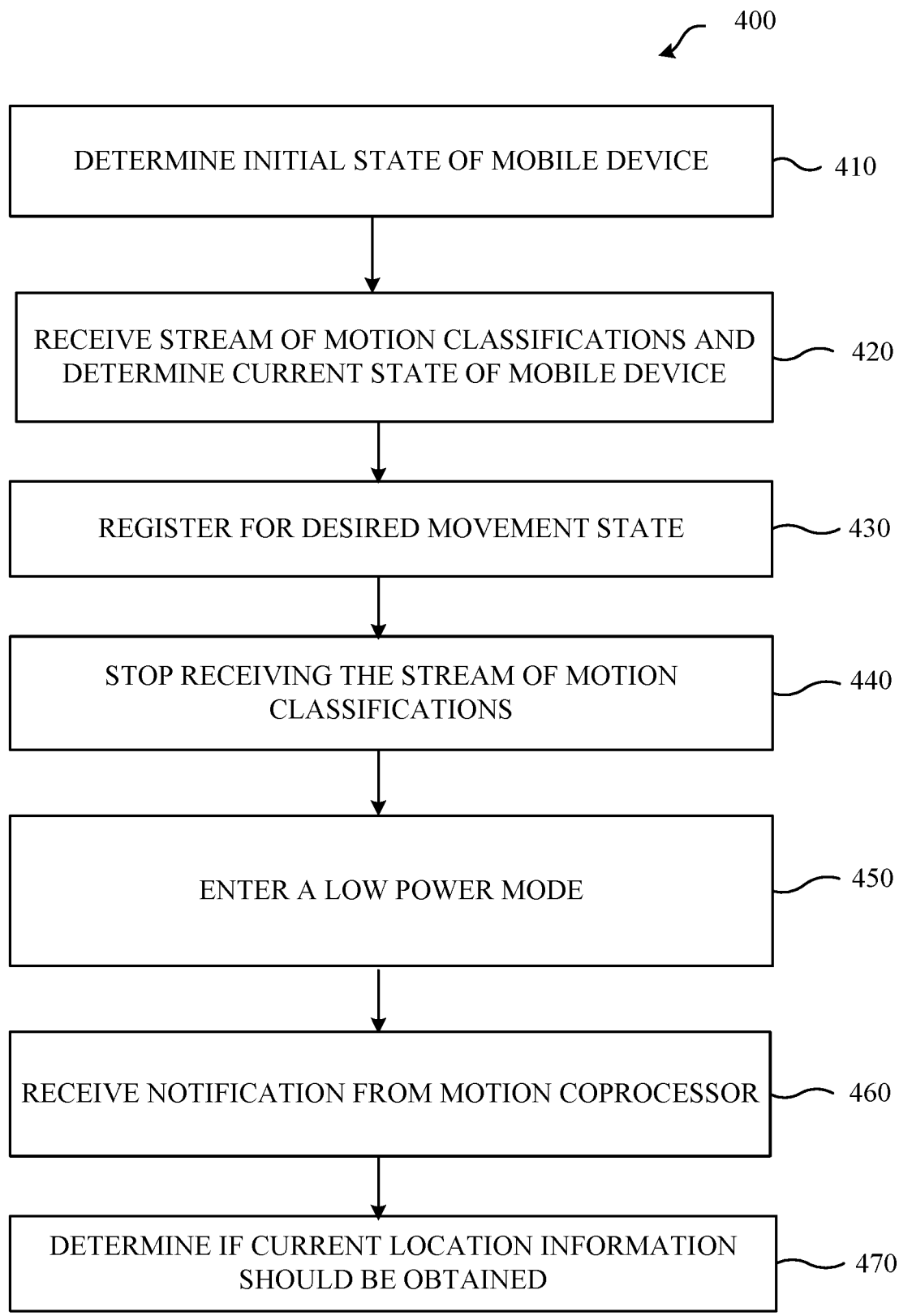
FIG. 4 illustrates a flowchart of a method of an application processor registering for a desired transition state, in accordance with some example embodiments.

FIG. 4 illustrates a flowchart of a method 400 of an application processor registering for a desired transition state with a motion coprocessor, in accordance with some example embodiments. The method 400 in FIG. 4 can corresponds to steps in method 100 of FIG. 1 and method 400 of FIG. 3.

At step 410, the application processor determines the initial state of the mobile device. In the example in FIG. 4, the application processor can determine that the mobile device is initially in an unknown state. The mobile device can be in an unknown state until an additional movement classification is obtained from a motion coprocessor.

At step 420, a current state of the mobile device is determined. The application processor can receive a stream of movement information, including motion classifications, from the motion coprocessor in order to determine a current state. For example, based on the received movement information, the application processor can determine it is currently in a settled state. However, this is merely an example. Based on the stream of motion classifications it can be determined that the application processor is an unsettled state or the state may remain unknown.

At step 430, the application processor registers for a particular movement state that the application processor desires to occur. For example, the application processor can register to be notified when a settled state occurs by sending a request to the coprocessor. The application processor can specific a particular transition from a first state to a second state to occur, e.g., where the mobile device has transitioned from an unsettled state to a settled state, or from a settled state to an unsettled state. The coprocessor can translate the movement state received from the application to a corresponding motion classification. Alternatively, the application processor can translate the desired movement state to a corresponding motion classification.

If the application processor is in an unknown state in step 420, the application processor can register to be notified in the event either a settled or unsettled state occurs. In the example shown in FIG. 4, since the application processor is determined to be in a settled state, at step 430, the application processor can register to be notified when the motion state becomes an unsettled state.

At step 440, the application processor can notify the motion coprocessor that it no longer needs to receive the of motion classifications classified by the motion coprocessor. For example, when the application processor determines it has sufficient information to determine a current state of the mobile device, the application processor can stop receiving the stream of motion classifications. Such a notification can be made in the request from step 430. Alternatively, the notification can occur before or after the request. Such a determination that motion classifications are no longer needed can be made when the application processor determine that it will go into a low power mode.

At step 450, after the application processor has registered, the application processor goes to sleep or enters a low power mode.

At step 460, in the event the state that the application processor has registered for has occurred, the application processor can receive a notification from the motion coprocessor and determine if it should wake up. The notification can be received by part of the application processor, and thus the analysis of the notification does not need the entire application processor to wake up. The analysis can confirm the notification was properly generated, e.g., by when the notification includes a current motion classification. For instance, if the motion classification corresponds to the desired movement state, then the application processor can wake up. In the example shown in FIG. 4, in the event the mobile device has transitioned to the unsettled state, the application processor will wake up.

At step 470, the application processor will obtain current location information. For example, the application processor can request a current location of the mobile device from a GPS.

V. Method of Determining Motion Classification

Figure 5:
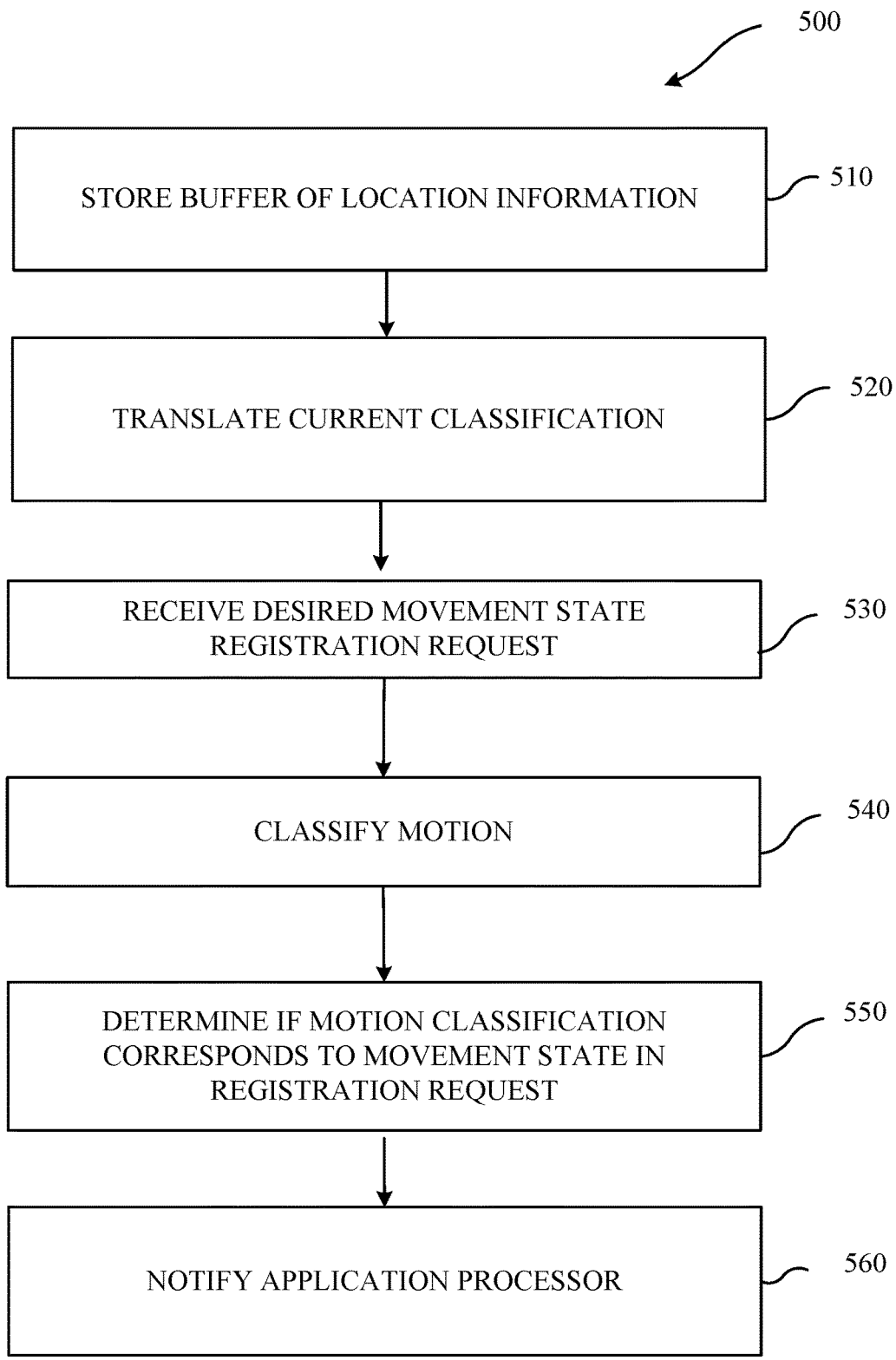
FIG. 5 illustrates a flowchart of a method of determining the motion classification of the mobile device movement information, in accordance with some example embodiments.

FIG. 5 illustrates a method of determining the motion classification of the mobile device movement information, in accordance with some example embodiments. The coprocessor interprets the movement information in order to classify the movement information. The coprocessor can determined whether the classification corresponds to the movement state desired by the application processor.

At step 510, the motion coprocessor stores a buffer of motion information. The motion information can be obtained from one or more sensors such as an accelerometer or gyroscope. The motion processor collects movement information over time.

At step 520, the motion coprocessor translates a current classification of the mobile device to either a settled state or an unsettled state. For example, the motion coprocessor can use a translation table to translate the movement states from the application processor to a corresponding motion classification.

At step 520, the motion coprocessor receives the registration request generated by the application processor. The request includes the movement state that is desired by the application processor. The request can include the movement state (e.g., settled or unsettled), where the specific transition is not specified. Alternatively, the request can specify the transition (e.g., settled to unsettled, unsettled to settled, etc.) that is needed for triggering the application processor to wake up. In the example described above, with FIG. 4, the application processor requests to be notified that the state of the mobile device has transitioned from a settled state to an unsettled state.

In embodiments where there is not a 1-1 corresponding between movement states (as determined by the application processor) and motion classifications (as determined by a coprocessor), a translation can be performed, e.g., by the application processor or the coprocessor. For example, the movement state in the registration request can be translated to one or more corresponding motion classifications by the application processor, prior to sending the registration request to the motion coprocessor. Alternatively, the request sent by the application processor can include the desired movement state and the motion coprocessor can translate the movement state to a motion classification.

Figure 6A:
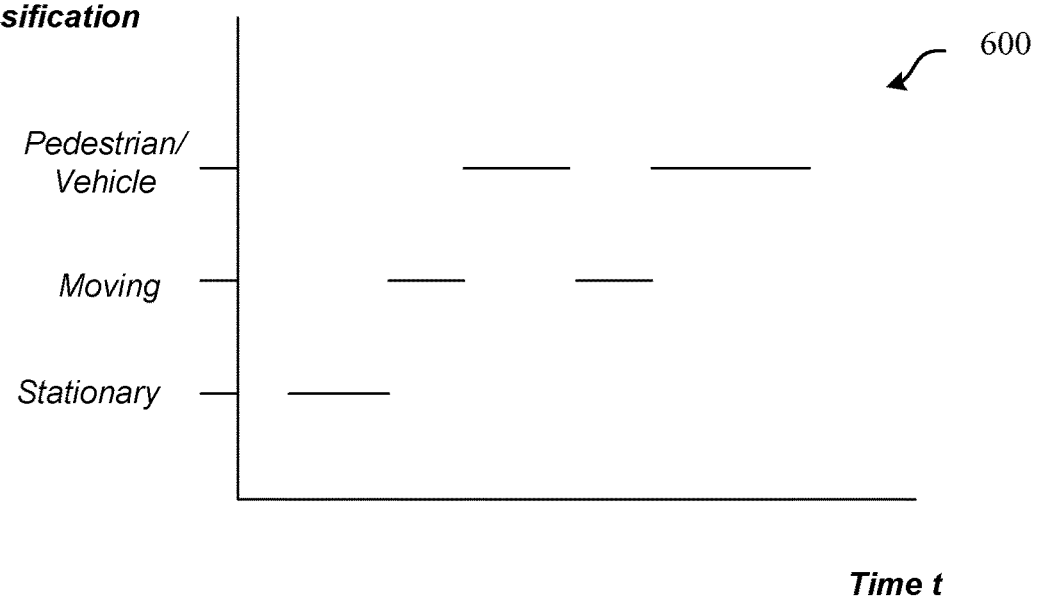
FIGS. 6A and 6B illustrate the classification of movement information by the motion coprocessor, in accordance with some embodiments.
Figure 6B:
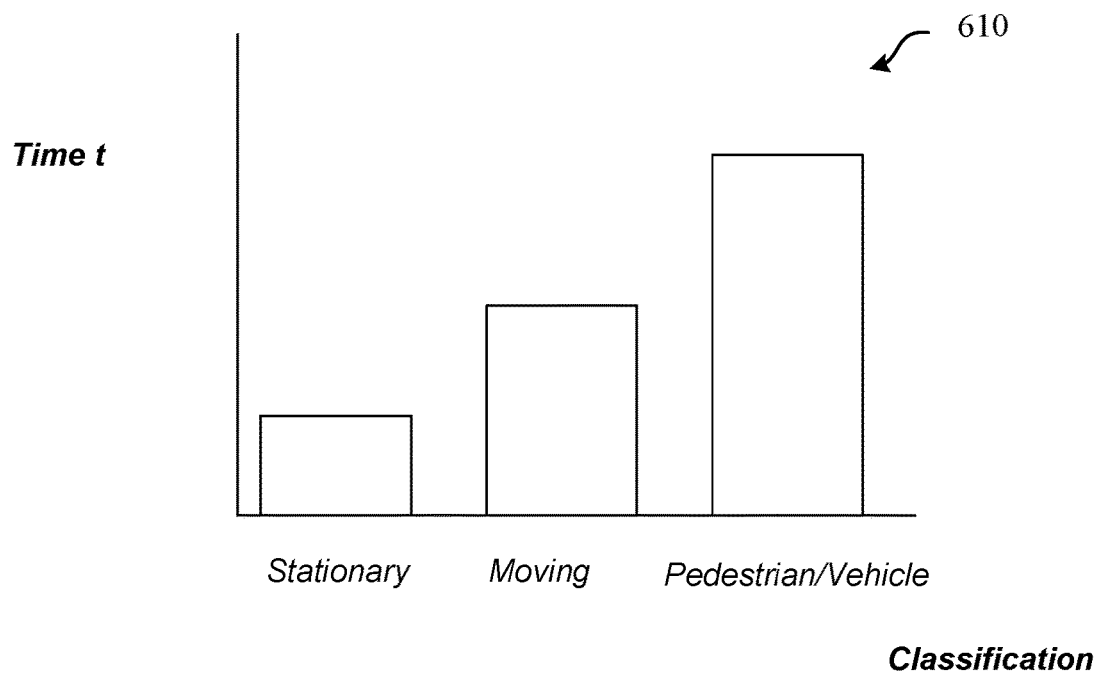

At step 530, the motion coprocessor classifies the movement information of the mobile device. FIGS. 6A and 6B illustrates the classification of movement information by the motion coprocessor, in accordance with some embodiments.

As shown in plot 600, time appears in the x-axis and the classifications "stationary," "moving," and "pedestrian/vehicle" appear on the y-axis. The movement information that is received from motion sensors can be classified as, for example, stationary, moving, or pedestrian/vehicle. However, these are merely examples and other classifications can be used.

Stationary can correspond to the settled state in the application processor. Pedestrian/vehicle classification can correspond to the unsettled state in the application processor. Moving can correspond to either the settled or unsettled state based on whether the moving values are higher or lower on the x-axis. Further, stationary can be a state in which the mobile device is not moving. Moving can be a state where the mobile device is not stationary, however, the mobile device is not in a pedestrian or vehicle state. In a moving state, the mobile device is in between a stationary and pedestrian/vehicle state. The pedestrian/vehicle classification corresponds to a pedestrian state or vehicle state and can include walking, running, and driving.

As shown in plot 600, movement information for the different classifications is analyzed continuously over a time window t. As shown in plot 600, during a time window t the movement information of the mobile device is classified as stationary, moving, pedestrian/vehicle, then back to moving and then back to pedestrian vehicle. Therefore, over a time window t, the movement information of the mobile device was classified as either one of stationary, moving, or pedestrian/vehicle. That is, a motion classification can be allocated to each point in time in the time window t.

Histogram 610 summarizes the movement information that was classified in plot 600. As shown in histogram 610, the pedestrian/vehicle classification appears the most often during the given time window. Therefore, the mobile device movement information is classified as pedestrian/vehicle, which corresponds to the unsettled state of the application processor. The classification that occurs the most over a predetermined period of time can be identified as the current classification. For example, if the stationary classification occurs most often during the time window, it can be determined that the mobile device is in a settled state. If the walking classification occurs the most, it can be determined that the mobile device is in an unsettled state. The more time that the classification occurs, the more confidence there is in determining that classification as being a final motion classification for the time window. Although in the example described the pedestrian/vehicle classification appears most often, the classification may not be clear and classifications may be averaged to identify an appropriate classification.

Based on the stream of motion classifications shown in grid 600 and the histogram 610, the motion coprocessor can determine that the mobile device should be classified as pedestrian/vehicle, which corresponds to the unsettled state of the application processor. The motion coprocessor can provide the motion classification having the highest confidence score, based on the histogram 610, to the application processor. Therefore, the motion coprocessor can provide a hierarchy of the motion classifications to the application processor in order for the application processor to determine a current motion classification. The use of histogram 610 can prevent a coprocessor from waking the application processor up when a particular classification occurs only briefly.

Alternatively, the motion coprocessor can provide a plurality of motion classifications and their corresponding confidence scores to the application processor, and the application processor can identify a current movement state using the motion classifications. Such a technique can be used by the application processor for the determination of a current movement state before the application processor sends a request to be woken for a particular movement state or one or more motion classifications, and goes to a low power state.

Accordingly, the motion coprocessor generates the histogram 610. However, in another example embodiment, the application processor can generate the histogram 610 based on the motion classifications, as shown in grid 600, that can be received from the motion coprocessor.

Further, the application processor can determine the first movement state (e.g., step 310 in FIG. 3) of the mobile device. That is, in determining the first movement state, the motion coprocessor can provide the motion classification having the highest confidence score, or a plurality of motion classifications and their corresponding confidence scores, to the application processor; and the application processor can determine the first movement state. Alternatively, the application processor can receive the stream of motion classifications from the motion coprocessor and identify a most likely current motion classification from the stream of motion classifications, for determining the first movement state of the mobile device.

At step 540, the motion coprocessor determines if the classification matches the state in the registration request. In the example of FIG. 4, the application processor requests to be notified that the state of the mobile device has transitioned from a settled state to an unsettled state. Therefore, the motion coprocessor determines that based on the motion classification histograms, which indicate the pedestrian/vehicle classification, the mobile device matches the state in the registration request.

At step 550, if the motion coprocessor determines that the classification matches the registration request in step 540, the motion coprocessor notifies or wakes up the application processor. The motion coprocessor informs the application processor that the desired state has occurred. The motion coprocessor can notify the application processor via an alert message. Such an alert message have a particular bit or flag set, so as to enable waking up the application processor.

Further details on determining a motion classification based on sensor measurements can be found in U.S. Pat. No. 9,603,123 to Jackson et al., titled "SENDING SMART ALERTS ON A DEVICE AT OPPORTUNE MOMENTS USING SENSORS."

Although the example embodiment has been described with respect to a motion coprocessor, other coprocessors can be used. For example, a WiFi chip can determine network classifications, which can correspond to motion classifications. And, a power supply can determine power classifications.

Therefore, in accordance with example embodiments, determining a mobile device location can be based on a change in state or change in events related to the mobile device.

VI. Mobile Device

Figure 7:
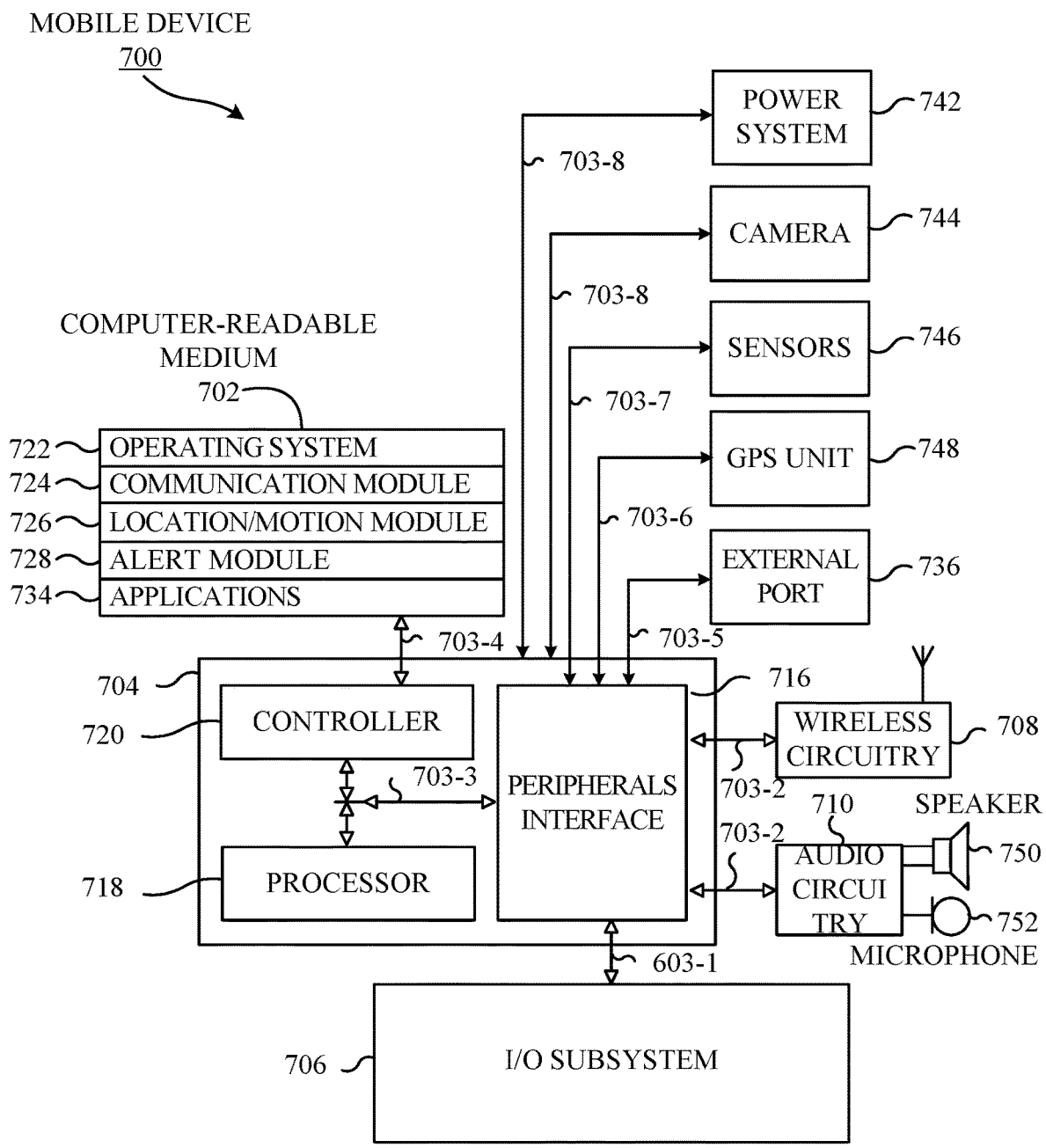
FIG. 7 is a block diagram illustrating an example device, in accordance with some example embodiments.

FIG. 7 is a block diagram of an example device 700, in accordance with some example embodiments. The example device can be a mobile device. Device 700 generally includes computer-readable medium 702, a processing system 704, an Input/Output (I/O) subsystem 706, wireless circuitry 708, and audio circuitry 710 including speaker 750 and microphone 752. These components may be coupled by one or more communication buses or signal lines 703. Device 700 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 7 is only one example of an architecture for device 700, and that device 700 can have more or fewer components than shown, or a different configuration of components. The various components shown in FIG. 7 can be implemented in hardware, software, or a combination of both hardware and software, including one or more signal processing and/or application specific integrated circuits.

Wireless circuitry 708 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 708 can use various protocols, e.g., as described herein.

Wireless circuitry 708 is coupled to processing system 704 via peripherals interface 716. Interface 716 can include conventional components for establishing and maintaining communication between peripherals and processing system 704. Voice and data information received by wireless circuitry 708 (e.g., in speech recognition or voice command applications) is sent to one or more processors 718 via peripherals interface 716. One or more processors 718 are configurable to process various data formats for one or more application programs 734 stored on medium 702.

Peripherals interface 716 couple the input and output peripherals of the device to processor 718 and computer-readable medium 702. One or more processors 718 communicate with computer-readable medium 702 via a controller 720. Computer-readable medium 702 can be any device or medium that can store code and/or data for use by one or more processors 718. Medium 702 can include a memory hierarchy, including cache, main memory and secondary memory.

Device 700 also includes a power system 742 for powering the various hardware components. Power system 742 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 700 includes a camera 744. In some embodiments, device 700 includes sensors 746. Sensors can include accelerometers, compass, gyrometer, pressure sensors, audio sensors, light sensors, barometers, and the like. Sensors 746 can be used to sense location aspects, such as auditory or light signatures of a location.

In some embodiments, device 700 can include a GPS receiver, sometimes referred to as a GPS unit 748. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 718 run various software components stored in medium 702 to perform various functions for device 700. In some embodiments, the software components include an operating system 722, a communication module (or set of instructions) 724, a location module (or set of instructions) 726, an alert module 728, and other applications (or set of instructions) 734, such as a car locator app and a navigation app.

Operating system 722 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 724 facilitates communication with other devices over one or more external ports 736 or via wireless circuitry 708 and includes various software components for handling data received from wireless circuitry 708 and/or external port 736. External port 736 (e.g., USB, FireWire, Lightning connector, 60-pin connector, etc.) is adapted for coupling directly to other devices or indirectly over a network (e.g., the Internet, wireless LAN, etc.).

Location/motion module 726 can assist in determining the current position (e.g., coordinates or other geographic location identifier) and motion of device 700. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 726 receives data from GPS unit 748 and analyzes the signals to determine the current position of the mobile device. In some embodiments, location/motion module 726 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 708 and is passed to location/motion module 726. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 700 based on the position coordinates of the corresponding transmitters. Regardless of the specific location technology used, location/motion module 726 receives information from which a location fix can be derived, interprets that information, and returns location information, such as geographic coordinates, latitude/longitude, or other location fix data.

Alert module 728 (or alert system) can include various sub-modules or systems.

The one or more applications 734 on the mobile device can include any applications installed on the device 700, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 706 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 706 can include a display and user input devices such as a keyboard, mouse, and/or track pad. In some embodiments, I/O subsystem 706 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 702) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 700 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the example embodiments may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Although specific embodiments have been described, various modifications, alterations, alternative constructions, and equivalents are also encompassed within the scope of the example embodiments. The example embodiments are not restricted to operation within certain specific data processing environments, but are free to operate within a plurality of data processing environments. Additionally, although example embodiments have been described using a particular series of transactions and steps, it should be apparent to those skilled in the art that the scope of the example embodiments are not limited to the described series of transactions and steps. Various features and aspects of the above-described embodiments may be used individually or jointly.

Further, while example embodiments have been described using a particular combination of hardware and software, it should be recognized that other combinations of hardware and software are also within the scope of the example embodiments. The example embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method for determining a location of a mobile device comprising:
    identifying, by an application processor of the mobile device, that the mobile device is currently in a first movement state;
    sending, by the application processor to a coprocessor of the mobile device, a request to identify a change in a current movement state of the mobile device to a second movement state and to notify the application processor regarding the change in the current movement state of the mobile device;
    after sending the request, decreasing, by the application processor, a power level of the application processor;
    monitoring over a period of time, by the coprocessor, movement information to determine a motion classification of the mobile device, wherein determining the motion classification of the mobile device comprises:
        identifying a plurality of different motion types in the movement information that is monitored over the period of time;
        determining a frequency of each of the plurality of different motion types; and
        identifying the motion classification of the mobile device based on the plurality of different motion types having a highest frequency of movement information during the period of time;
    determining, by the coprocessor, that the motion classification corresponds to the second movement state; and
    sending, by the coprocessor to the application processor, a notification regarding the motion classification of the mobile device corresponding to the second movement state.

2. The method according to claim 1, further comprising:
    determining, by the application processor, based on the notification, whether to obtain location information;
    in response to determining that the location information should be obtained, increasing, by the application processor, the power level of the application processor in response to receiving the notification; and
    obtaining, by the application processor, the location information of the mobile device after increasing the power level of the application processor.

3. The method according to claim 1, further comprising:
    determining if a default time period has expired; and
    in response to the default time period expiring:
        determining, by the application processor, based on the notification, whether to obtain location information;
        in response to determining that the location information should be obtained, increasing, by the application processor, the power level of the application processor in response to receiving the notification; and
        obtaining, by the application processor, the location information of the mobile device after increasing the power level of the application processor.

4. The method according to claim 2, wherein the coprocessor translates the motion classification to a corresponding movement state of the application processor.

5. The method according to claim 1, wherein the application processor determines that the mobile device is currently in the first movement state based on a stream of movement information received from the coprocessor.

6. The method according to claim 1, wherein the application processor identifies a desired movement state and identifies the desired movement state in the request to the coprocessor.

7. The method according to claim 1, wherein the coprocessor analyzes the movement information to classify the movement information of the mobile device.

8. The method according to claim 7, wherein the movement information of the mobile device is classified as one of a stationary state and a moving state, wherein the moving state is one of a pedestrian state or vehicle state.

9. The method according to claim 7, wherein the movement information is received from one of an accelerometer and a gyroscope.

10. The method according to claim 1, wherein the application processor is a central processing unit of the mobile device.

11. The method according to claim 1, wherein the coprocessor comprises one of a motion coprocessor and a network chip.

12. The method according to claim 1, wherein the first movement state is one of an unknown state, a settled state, and an unsettled state.

13. The method according to claim 12, wherein the unsettled state comprises a change to a location coordinate of the mobile device.

14. The method according to claim 2, wherein the location information comprises geographic coordinate information.

15. A computer product comprising a non-transitory computer readable medium storing a plurality of instructions that when executed control a device including one or more processors, the instructions comprising:
    identifying, by an application processor of a mobile device, that the mobile device is currently in a first movement state;
    sending, by the application processor to a coprocessor of the mobile device, a request to identify a change in a current movement state of the mobile device to a second movement state and to notify the application processor regarding the change in the current movement state of the mobile device;
    after sending the request, decreasing, by the application processor, a power level of the application processor;
    monitoring over a period of time, by the coprocessor, movement information to determine a motion classification of the mobile device, wherein determining the motion classification of the mobile device comprises:
        identifying a plurality of different motions types in the movement information that is monitored over the period of time;

determining a frequency of each of the plurality of different motion types; and identifying the motion classification of the mobile device based on the plurality of different motion types having a highest frequency of movement information during the period of time;

determining, by the coprocessor, that the motion classification corresponds to the second movement state; and sending, by the coprocessor to the application processor, a notification regarding the motion classification of the mobile device corresponding to the second movement state.

16. The computer product according to claim 15, further comprising:

determining, by the application processor, based on the notification, whether to obtain location information;

in response to determining that the location information should be obtained, increasing, by the application processor, the power level of the application processor in response to receiving the notification; and obtaining, by the application processor, the location information of the mobile device after increasing the power level of the application processor.

17. The computer product according to claim 15, further comprising:

determining if a default time period has expired; and in response to the default time period expiring:

determining, by the application processor, based on the notification, whether to obtain location information;

in response to determining that the location information should be obtained, increasing, by the application processor, the power level of the application processor in response to receiving the notification; and obtaining, by the application processor, the location information of the mobile device after increasing the power level of the application processor.

18. A device comprising:

one or more sensors; and one or more processors configured to:

identify, by an application processor of a mobile device, that the mobile device is currently in a first movement state;

send, by the application processor to a coprocessor of the mobile device, a request to identify a change in a current movement state of the mobile device to a second movement state and to notify the application processor regarding the change in the current movement state of the mobile device;

after sending the request, decrease, by the application processor, a power level of the application processor;

monitor over a period of time, by the coprocessor, movement information to determine a motion classification of the mobile device, wherein determining the motion classification of the mobile device comprises:

identify a plurality of different motion types in the movement information over the period of time;

determine a frequency of each of the plurality of different motion types; and identify the motion classification of the mobile device based on the plurality of different motion types having a highest frequency of movement information during the period of time;

determine, by the coprocessor, that the motion classification corresponds to the second movement state; and send, by the coprocessor to the application processor, a notification regarding the motion classification of the mobile device corresponding to the second movement state.

19. The device according to claim 18, further comprising one or more processors configured to:

determine based on the notification, whether to obtain location information;

in response to determining that the location information should be obtained, increase the power level of the application processor in response to receiving the notification; and obtain the location information of the mobile device after increasing the power level of the application processor.

20. The device according to claim 18, further comprising one or more processors configured to:

determine if a default time period has expired; and in response to the default time period expiring:

determine based on the notification, whether to obtain location information;

in response to determining that the location information should be obtained, increase the power level of the application processor in response to receiving the notification; and obtain the location information of the mobile device after increasing the power level of the application processor.

21. The method according to claim 11, the motion coprocessor comprises a gyroscope or an accelerometer, and wherein the network chip comprises a WiFi chip.

22. The method according to claim 12, wherein the unknown state is a state in which the state of the mobile device is not currently known, wherein the settled state is a state in which device sensors indicate that the mobile device is stationary or a state in which a WiFi access point is consistently available, and wherein the unsettled state is a state in which motion sensors of the mobile device indicate that the mobile device is in a moving state or a state in which a WiFi signal is not consistently available.

23. The method according to claim 1, wherein each of the plurality of different motion types occurs in at least one instance of the movement information over the period of time.

* * * * *